United States Patent
Arai et al.

(10) Patent No.: US 6,904,298 B2
(45) Date of Patent: Jun. 7, 2005

(54) MOBILE INFORMATION COMMUNICATING TERMINAL DEVICE HAVING VIDEO CAMERA

(75) Inventors: Fujio Arai, Yokohama (JP); Yutaka Masutani, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 56 days.

(21) Appl. No.: 09/958,773

(22) PCT Filed: Feb. 23, 2001

(86) PCT No.: PCT/JP01/01369

§ 371 (c)(1),
(2), (4) Date: Oct. 12, 2001

(87) PCT Pub. No.: WO01/63926

PCT Pub. Date: Aug. 30, 2001

(65) Prior Publication Data

US 2002/0160724 A1 Oct. 31, 2002

(30) Foreign Application Priority Data

Feb. 28, 2000 (JP) ..................................... P.2000-051375

(51) Int. Cl.[7] ................................................ H04B 1/00
(52) U.S. Cl. .................................. 455/556.1; 348/14.01
(58) Field of Search ........................... 455/550.1, 556.1, 455/556.2, 551, 90.1, 557; 348/14.01, 14.02–14.04

(56) References Cited

U.S. PATENT DOCUMENTS 5,801,919 A * 9/1998 Griencewic ................ 361/683
5,825,408 A * 10/1998 Yuyama et al. .......... 348/14.01
6,009,336 A   12/1999 Harris et al.
6,392,697 B1 *  5/2002 Tanaka et al. ........... 348/220.1
6,473,631 B1 * 10/2002 Siddoway et al. ....... 455/575.1

FOREIGN PATENT DOCUMENTS

| CN | 1208529 A | 2/1999 | |
| EP | 0 930 770 A2 * | 7/1999 | ............ H04N/1/00 |
| JP | 08-294030 | 11/1996 | |

OTHER PUBLICATIONS

Patent Abstracts of Japan, Radio Image Transmission Telephone Set, publ. no. 09130489, publ. date May. 1997.

Patent Abstracts of Japan, Video Camera Integrated With Portable Telephone Set, publ. no. 08294030, publ. date Nov. 1996.

* cited by examiner

*Primary Examiner*—Nick Corasaro
(74) *Attorney, Agent, or Firm*—Pearne & Gordon LLP (57) ABSTRACT

A mobile information communicating terminal device having a video camera includes a camera receiver unit pivotally supported in a vertical direction with respect to an upper edge face of the device. When the device is employed as a video camera, the camera receiver unit is rotated about a vertical axis to a position in which a video camera portion of the camera receiver unit is located at a back side of the device. When the device is employed as a mobile television telephone, the vertical relationship of the video camera is not changed. Therefore, a vertical inversion processing of an image signal is not required.

11 Claims, 7 Drawing Sheets

MOBILE INFORMATION COMMUNICATING TERMINAL DEVICE HAVING VIDEO CAMERA

This application claims the benefit of International Application Number PCT/JP01/01369, which was published in English on Aug. 30, 2001.

BACKGROUND OF THE INVENTION

The present invention relates to a mobile information communicating terminal device having a video camera, and more particularly to a mobile information communicating terminal device having a video camera which does not require a vertical inversion processing of an image signal even if an object to be photographed is changed from a forward object of the device to a rearward object thereof.

A mobile telephone has rapidly spread with a development of multifunctionality, for example, a size can be reduced, a price can be cut down, and an electronic mail can be exchanged and internet can be accessed in addition to calling.

Figure 9:
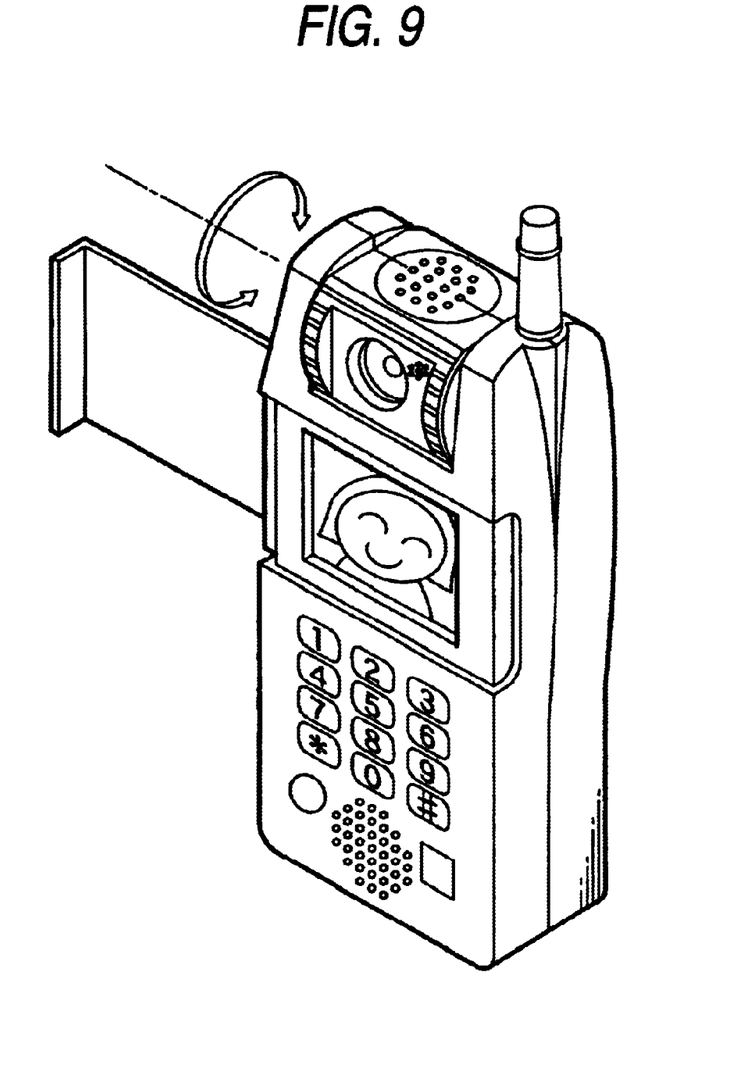
FIG. 9 is a perspective view showing the appearance of the front face side of a mobile telephone having a video camera according to a conventional art.

If a mobile telephone and a video camera are combined with each other and an image can be fetched and transmitted, the mobile telephone becomes more convenient to be utilized as the video camera and a mobile television telephone. As a composite device having a mobile telephone and a video camera combined with each other, JP-A-8-294030 has described a mobile telephone integrating type video camera, for example as shown in FIG. 9. In the mobile telephone integrating type video camera, a camera housing having a video camera, an ear speaker and a microphone mounted integrally thereon is pivotally supported on an upper part of a housing body to be rotatable (tiltable) in a horizontal direction. The video camera and the microphone are provided on the same plane and the ear speaker is provided on an orthogonal plane. When the mobile telephone integrating type video camera is to be used as a hand set type telephone, the ear speaker is turned toward a front face of a housing body and the video camera is caused to go around in the housing. Moreover, when the mobile telephone integrating type video camera is to be used as a hands free type television telephone for photographing a caller's face, a video camera is rotated toward the front face side of a housing body. When the mobile telephone integrating type video camera is to be used as a video camera for photographing an object present in a rear part, the video camera is rotated toward the back face side of the housing body.

In the mobile telephone integrating type video camera, the video camera is pivotally supported on the upper part of the housing body to be rotatable (tiltable) in the horizontal direction. Therefore, when the mobile telephone integrating type video camera is to be used as a television telephone for photographing his (her) own face and is to be used as a video camera for photographing an object present in a rear part, the video camera is vertically inverted. For this reason, when the mobile telephone integrating type video camera is to be used as the television telephone and is to be used as the video camera, an image signal should be subjected to a vertical inversion processing.

Moreover, when the conventional mobile telephone integrating type video camera is to be used as the hands free type television telephone, the video camera is rotated toward the front face of the housing body, that is, the side on which a display section such as a liquid crystal to be a monitor screen is provided. Therefore, there has been a problem in that an image of a caller's face seeing the display section can be transmitted but an image of an object on the back face side of the housing body which is being seen by the caller, for example, an image of an accident spot, a scene of a fire or a beautiful scenery which is being seen by the caller cannot be transmitted through a monitor to carry out explanation with a relay from the spot toward a calling party by means of a television telephone.

SUMMARY OF THE INVENTION

The invention has been made to solve such a problem and has an object to eliminate a vertical inversion processing of an image signal in a mobile telephone having a video camera capable of being used as a video camera and a television telephone.

Moreover, the invention has an object to optionally turn a video camera toward an object on the front face of a housing body and toward an object on the back face of the housing body at the time of the use for a hands free type television telephone.

The invention provides a mobile information communicating terminal device having a video camera, comprising a body and a camera receiver unit having a video camera and a receiver mounted thereon and pivotally supported in a vertical direction with respect to an upper edge face of the body. By this structure, the video camera can be rotated around an axis in a vertical direction of the body to carry out photographing. Therefore, at the time of the use as a television telephone for photographing a user's face and as a video camera for photographing an object present in a rear part, the vertical relationship of the video camera is not changed so that the vertical inversion processing of an image signal is not required.

Moreover, at the time of the use as a hands free type television telephone, it is possible to optionally transmit the image of an object on the front face of a housing body and to transmit the image of an object on the back face of the housing body.

DETAILED DESCRIPTION OF THE PREFERRED EMBODIMENTS

An embodiment of the invention will be described below with reference to the drawings.

Figure 1:
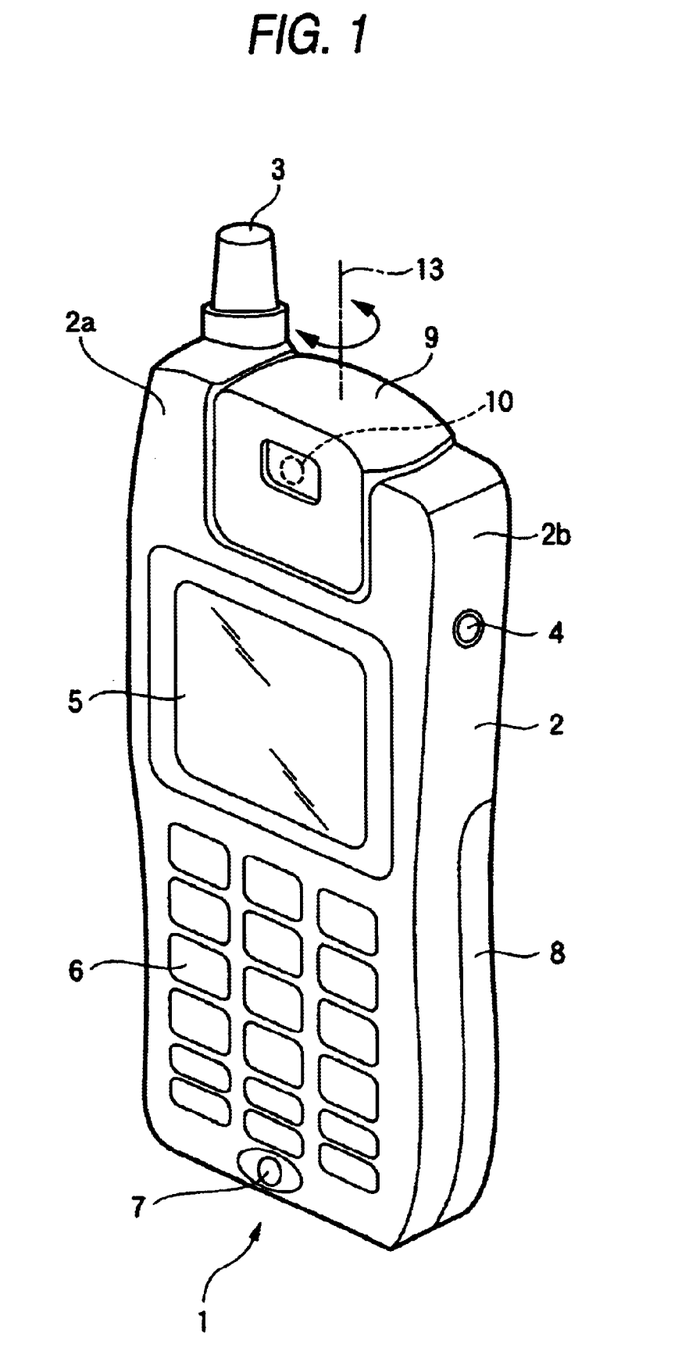
FIG. 1 is a perspective view showing the appearance of the front face side of a mobile telephone having a video camera according to an embodiment of the invention.
Figure 2:
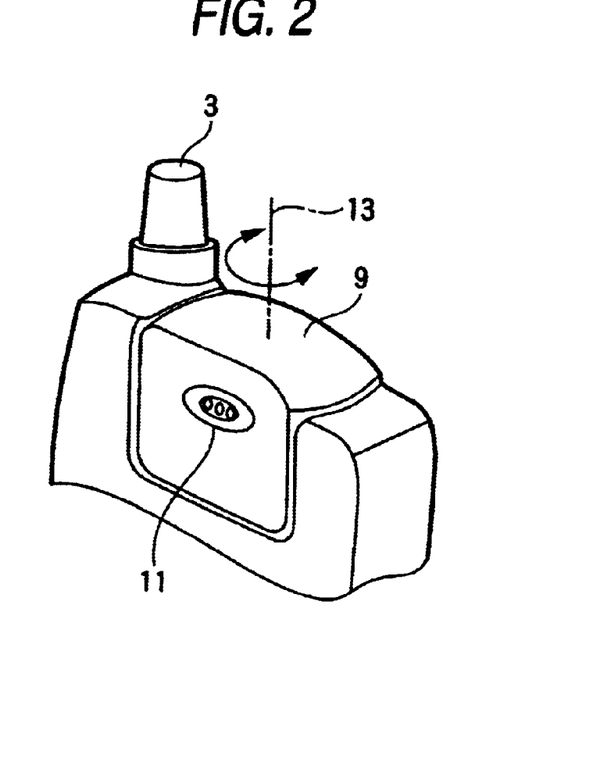
FIG. 2 is a perspective view showing the appearance of an upper portion on the back face side of the mobile telephone having a video camera according to the embodiment of the invention.

FIG. 1 is a perspective view showing the appearance of the front face side of a mobile telephone having a video camera according to the embodiment of the invention, and FIG. 2 is a perspective view showing the appearance of the upper part of the mobile telephone with a camera receiver unit rotated by 180 degrees.

A mobile telephone 1 having a video camera has an almost flat rectangular parallelepiped body 2 which has an antenna 3 provided on the left side of an upper end and a head set jack 4 provided on the right side surface thereof. Moreover, various operation keys 6 are arranged from the almost central portion of the front face of the body 2 to a lower part, and a microphone 7 is provided in a lower edge portion. Furthermore, a display section 5 constituted by a color LCD is provided above the operation key 6. Moreover, a removable battery pack 8 is attached from the almost central portion of the back face of the body 2 to a lower part.

The upper edge portion of the body 2 is protruded at the right and the left, thereby forming a left upper edge portion 2a of the body and a right upper edge portion 2b of the body. An almost rectangular parallelepiped concave portion may be formed on the center of the upper edge portion of the body 2. A camera receiver unit 9 is provided between the left upper edge portion 2a of the body and the right upper edge portion 2b of the body. The camera receiver unit 9 mounts a video camera section 10 and a receiver section 11 thereon. Moreover, an almost rectangular parallelepiped case is provided and has a light receiving face of the video camera section 10 provided on one of surfaces thereof and a voice output face of the receiver section 11 provided on the opposite surface. The camera receiver unit 9 is attached to the upper edge surface of the body 2 to be forward and reversely (clockwise and counterclockwise) rotatable around a vertical axis 13. Accordingly, the video camera section 10 can be rotated to carry out photographing.

Figure 3:
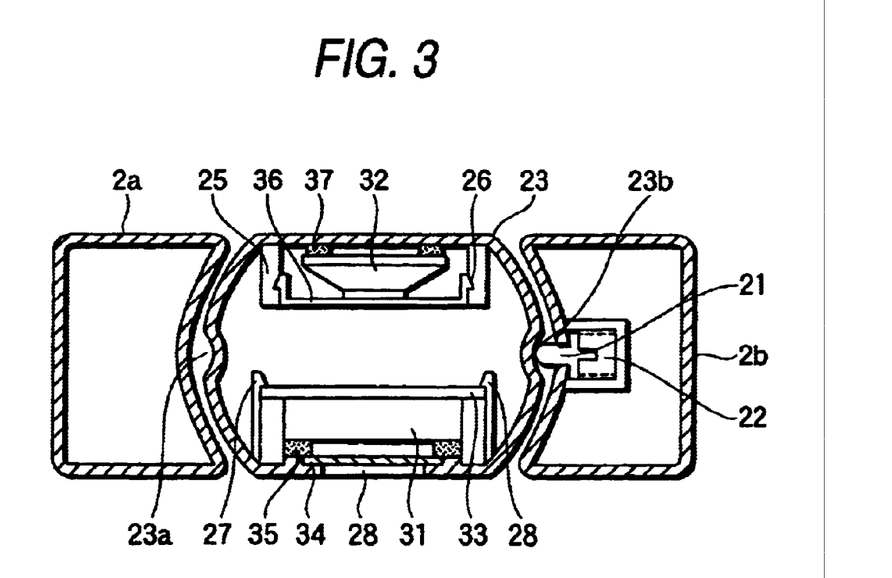
FIG. 3 is a sectional view showing a camera receiver unit of FIG. 1 taken along a plane perpendicular to an axis 13 which is seen from above.
Figure 4:
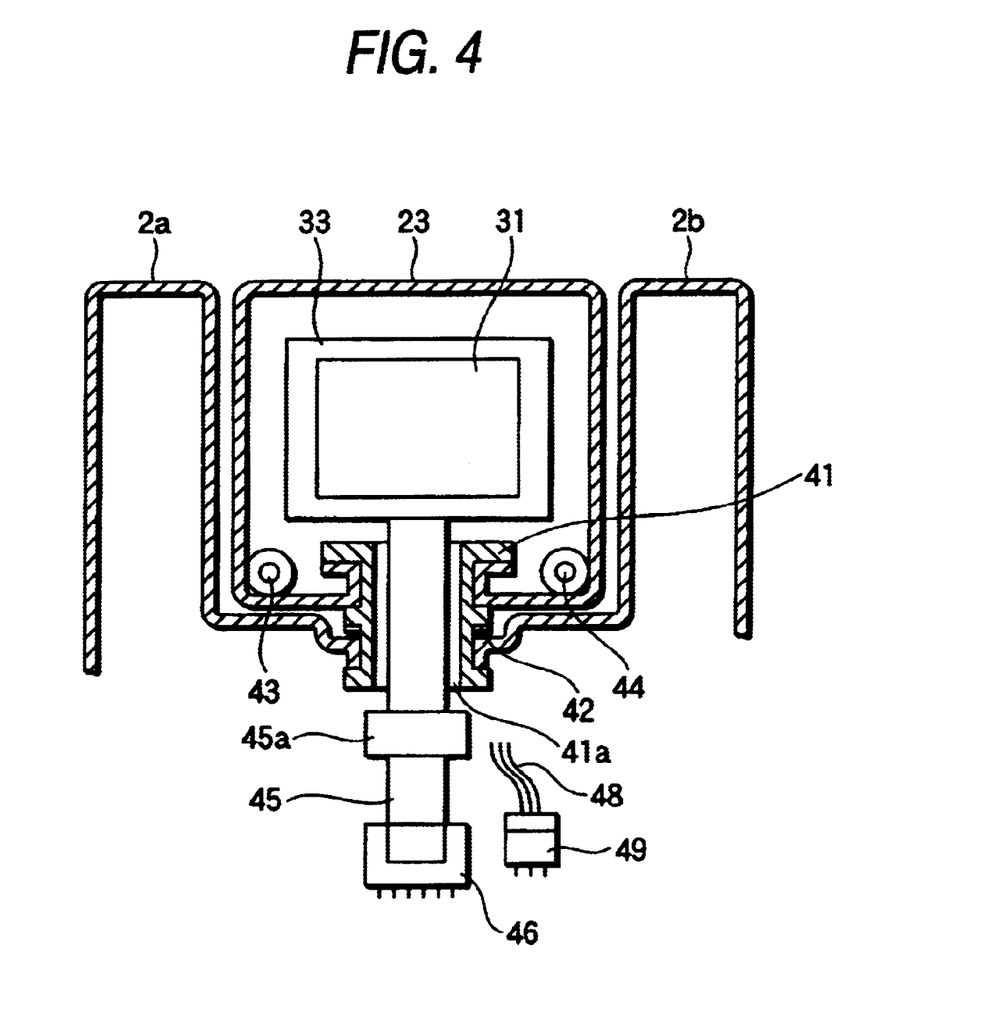
FIG. 4 is a sectional view showing the camera receiver unit of FIG. 1 taken along a plane parallel with the axis 13 which is seen from the front.
Figure 5:
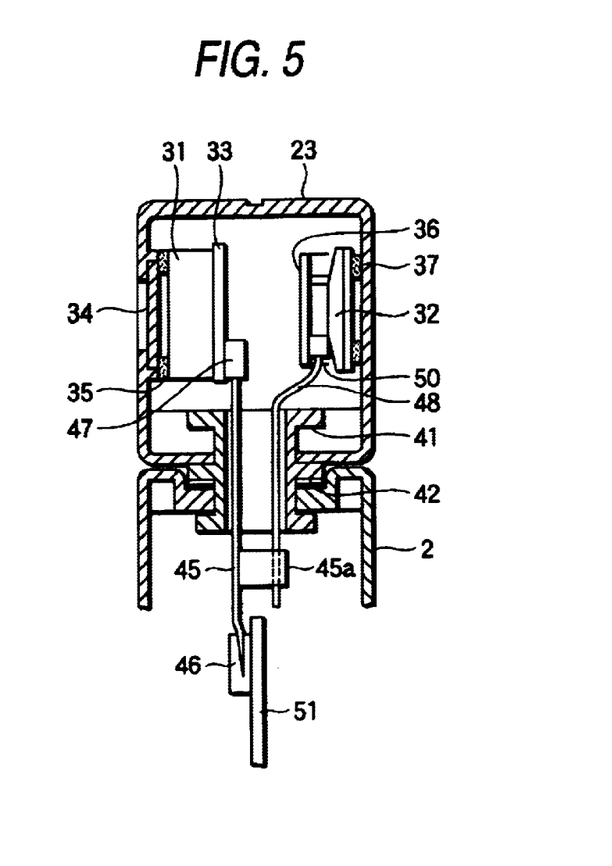
FIG. 5 is a sectional view showing the camera receiver unit of FIG. 1 taken along the plane parallel with the axis 13 which is seen from a right side surface.
Figure 6:
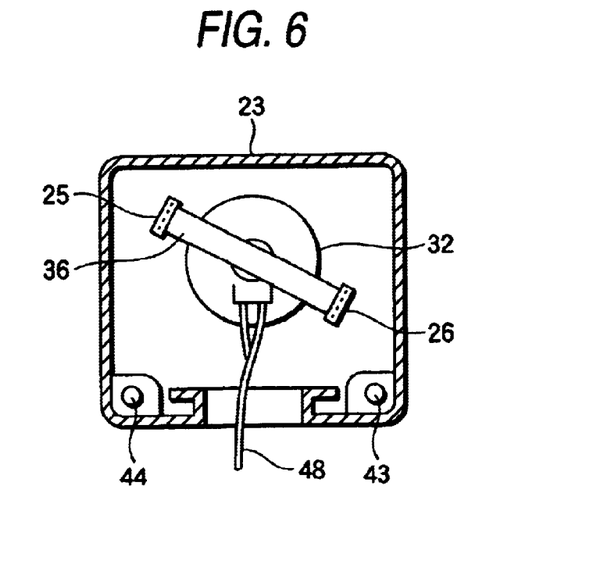
FIG. 6 is a sectional view showing the camera receiver unit of FIG. 1 taken along the plane parallel with the axis 13 which is seen from a back face.
Figure 7:
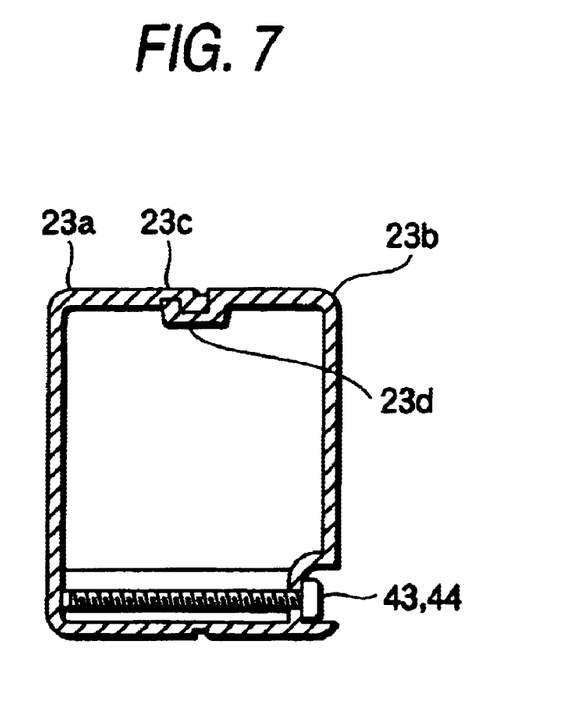
FIG. 7 is a sectional view illustrating the coupling structure of a housing of the camera receiver unit of FIG. 1.

The internal structure of the camera receiver unit 9 of the mobile telephone 1 having a video camera, which is basically constituted, as described above will be described with reference to FIGS. 3 to 8. FIG. 3 is a sectional view showing the camera receiver unit 9 taken along a plane perpendicular to the axis 13 of FIG. 1 which is seen from above, FIG. 4 is a sectional view showing the camera receiver unit 9 taken along a plane parallel with the axis 13 which is seen from the front, FIG. 5 is a sectional view showing the camera receiver unit 9 taken along the plane parallel with the axis 13 which is seen from a right side surface, FIG. 6 is a sectional view showing the camera receiver unit 9 taken along the plane parallel with the axis 13 which is seen from a back face (rear face), FIG. 7 is a sectional view illustrating the coupling structure of a housing of the camera receiver unit 9, and FIG. 8 is a view illustrating the structure of an FPC (flexible printed board). For convenience, in the camera receiver unit 9, a surface turned toward the front face of the body in FIG. 1, that is, the light receiving face side of the video camera section 10 is set to be a front face and a forward portion.

As shown in FIG. 3, a camera unit printed board 33 is engaged through engaging portions 27 and 28 on the inside of the front face side of a camera receiver unit case 23. Moreover, a camera unit 31 having a lens system and an image pick-up element is mounted on the camera unit printed board 33. A camera cushion 35 is inserted between a tip on the front face side of the camera unit 31 and an internal wall surface of the camera receiver unit case 23. Furthermore, a panel 34 formed of a transparent resin is provided in front of the camera cushion 35.

Moreover, a second stopper 36 is engaged through engaging portions 25 and 26 on the inside of the back face side of the camera receiver unit case 23. A receiver 32 is mounted on the second stopper case 36. A receiver cushion 37 is inserted between the tip of the receiver 32 and the internal wall surface of the camera receiver unit case 23.

Concave portions 23a and 23b having longitudinal central portions narrowed slightly are formed in portions corresponding to both side surfaces of the camera receiver unit case 23, and a first stopper 21 protruded from the right upper edge portion 2b of the body abuts on the concave portion 23b in FIG. 3. The first stopper 21 presses the concave portion 23b of the camera receiver unit case 23 by the elastic force of a spring 22. Accordingly, when the camera receiver unit 9 is rotated around the axis 13 in the state shown in FIG. 1, the first stopper 21 is pressed by an external wall surface of the camera receiver unit case 23 and is then moved rightwards to compress the spring 22. When the camera receiver unit 9 is rotated by 180 degrees so that the concave portion 23a on the opposite side is opposed to the first stopper 21, the first stopper 21 is moved leftwards to press the concave portion 23a. In other words, the camera receiver unit 9 is stabilized in the state shown in FIG. 1 and a state obtained through a rotation by 180 degrees from the state of FIG. 1.

As shown in FIGS. 4 to 7, a shaft 41 is attached to the center of a concave portion formed between the left upper edge portion 2a of the body and the right upper edge portion 2b of the body to be rotatable by approximately ±180 degrees in the vertical direction of the body 2. The camera receiver unit case 23 is fixed to the shaft 41. Moreover, a washer 42 is fitted on the fixed part of the left upper edge portion 2a of the body and the right upper edge portion 2b of the body. The shaft 41 is hollow, and an FPC 45 for electrically connecting the camera unit 31 and the body printed board 51 and a lead wire 48 for electrically connecting the receiver 32 and the body printed board 51 penetrate through a cavity 41a. More specifically, the FPC 45 having an FPC connector 46 connected to the body printed board 51 and an FPC connector 47 connected to the camera unit printed board 33 provided on both ends thereof and a lead wire 48 having a lead wire connector 49 connected to the board printed board 51 and a lead wire connector 50 connected to the receiver 32 provided on both ends thereof penetrate through the cavity 41a in the shaft 41.

Figure 8A:
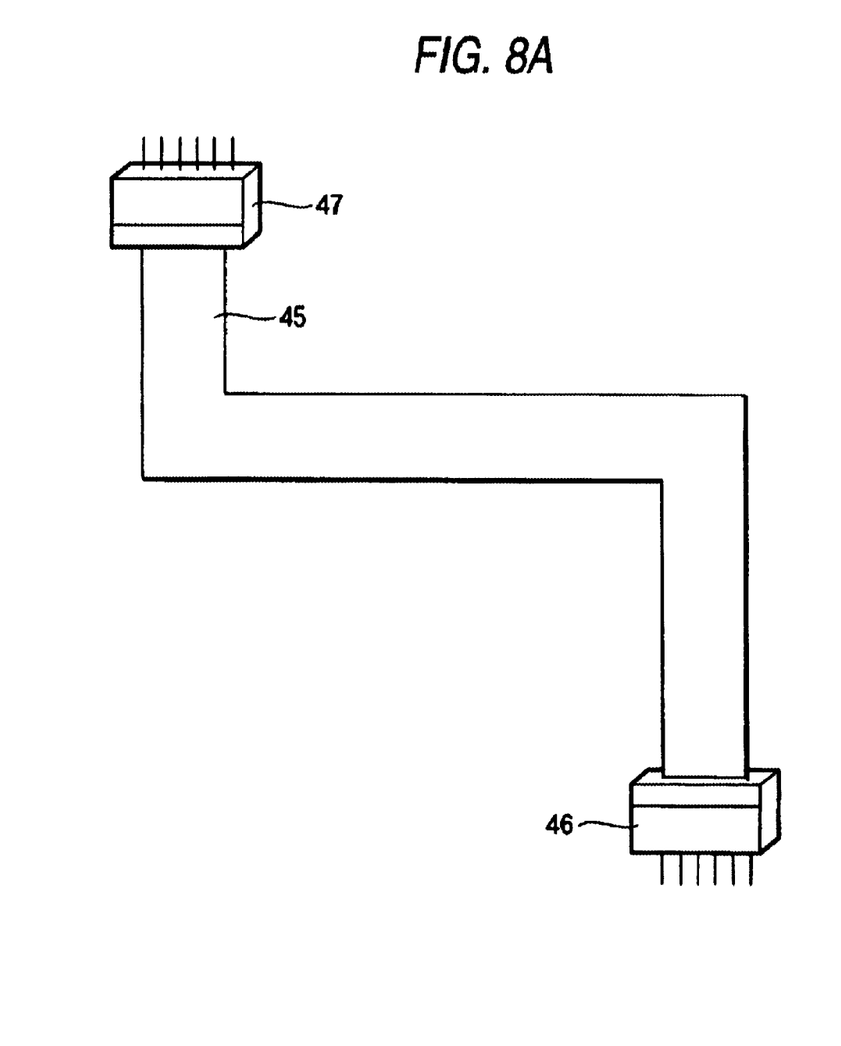
FIG. 8 is a view illustrating the structure of an FPC of the camera receiver unit.
Figure 8B:
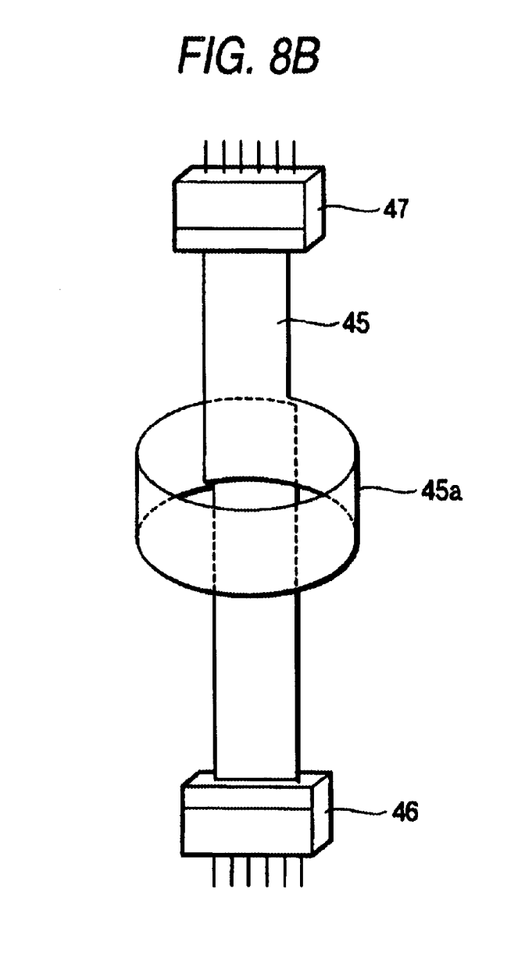

The FPC 45 originally has a shape shown in an expanded view of FIG. 8A, and a central portion thereof is twisted to form a loop 45a, and the FPC connectors 46 and 47 provided on the both ends are then connected thereto. By such a structure that the FPC 45 is rotated interlockingly with the rotation of the camera receiver unit 9 to loosen the twist of the loop 45a, the FPC 45 can be prevented from being broken.

As shown in FIG. 7, the camera receiver unit case 23 is constituted by the first case 23a and the second case 23b, and the first engaging portion 23c and the second engaging portion 23d which are provided on the center of an upper end are engaged with each other. Thus, the upper end of the case is fixed. The lower end of the case is fixed with a pair of screws 43 and 44.

Description will be given to the operation of the mobile telephone 1 having a video camera which is constituted as described above. First of all, in the case in which the mobile telephone 1 having a video camera is to be used as a hands free mobile television telephone, the camera receiver unit 9 is stopped in the state shown in FIG. 1. A user carries out calling while seeing the video camera section 10 turned toward the front face of the camera receiver unit 9. The voice of a calling party is output from the receiver section 11 turned toward the back face of the body 2, and the user's voice is input from the microphone 7 provided in the lower edge portion of the front face of the body 2. Alternatively, a plug of a head set may be inserted into the head set jack 4 so that calling can be carried out by using a microphone and a receiver which are provided in the head set. At this time, if the calling party is a television telephone, an image picked up by the video camera section 9 is displayed on the display section of the television telephone of the calling party and an image picked up by the video camera of the television telephone of the calling party is displayed on the display section 4. If the calling party is not the television telephone, an image is neither transmitted nor received. By rotating angle detecting means of the camera receiver unit provided in the body which is not shown, the rotating angle of the camera receiver unit 9 is detected. When the receiver section 11 is turned toward a back face, the voice output level of the receiver section 11 is suitably increased more than that obtained when the receiver section 11 is turned toward a front face.

Moreover, when the camera receiver unit 9 is rotated by 180 degrees in the state shown in FIG. 1 so that the front face of the video camera section 10 is turned toward the back face side of the body 2, an object on the back face side of the body 2, for example, the situation of an accident spot or a scene of a fire or a beautiful scenery which is being seen by a caller is photographed and transmitted. The caller can confirm, through the display section 5, that an object on the back face side of the housing body is photographed, and can therefore modify the direction of a camera easily such that a portion to be shown can come out well. It is possible to explain the situation to be shown to the calling party in a voice and to carry out a relay from the spot through the television telephone.

Furthermore, when the mobile telephone 1 having a video camera is to be used as an ordinary hand set type mobile telephone, the camera receiver unit 9 is rotated by 180 degrees in the state shown in FIG. 1 to turn the front face of the receiver section 11 toward the front face side of the body 2. The user causes an ear to touch the surface of the receiver section 11, and listens to the voice of the calling party and inputs his (her) own voice by using the microphone 7 provided in the lower edge portion of a front cover 2. At this time, the video camera section 10 is turned toward the back face. Therefore, it is possible to prevent stains from being made by the touch of the user's hair or skin.

On the other hand, when the mobile telephone 1 having a video camera is to be used as a video camera for photographing an object present in a rear part, the camera receiver unit 9 is rotated by 180 degrees in the state shown in FIG. 1 to turn the front face of the video camera section 10 toward the back face side of the body 2. An image picked up by the video camera section 10 is displayed on the display section 5 and the user can carry out photographing while seeing the display section 5. The image data thus picked up are stored in an internal memory (not shown). At this time, a voice on the periphery of the object may be input from the microphone 7. The image data and voice data stored in the memory can be then transmitted to another mobile telephone or can be output to a personal computer through an external connecting terminal (not shown).

As described above, according to the invention, there can be provided a mobile information communicating terminal device having a video camera in which a camera receiver unit having a video camera section and a receiver section mounted thereon is pivotally supported in a vertical direction with respect to the upper edge face of a mobile information communicating terminal device body so that the vertical inversion processing of an image signal is not required when the device is to be used as a television telephone for photographing a caller's own face and when the device is to be used as a video camera for photographing an object present in a rear part.

Moreover, it is possible to obtain an advantage that the image of an object on the front face of a housing body can be optionally transmitted and the image of an object on the back face of the housing body can be optionally transmitted when the device is to be used as a hands free type television telephone.

What is claimed is:

1. A mobile information communicating terminal device with a video camera comprising:

a body of the communication terminal device; and a camera receiver unit having a video camera section and a speaker section mounted, which is pivotally supported in a vertical direction with respect to an upper edge face of the body, wherein a light receiving face of the video camera section and a voice output face of the speaker section are separated into a front-side and a back-side of the camera receiver unit, and wherein at least one of the camera receiver unit and the body of the communication terminal device includes at least one stopper to facilitate stabilizing the camera receiver unit at predetermined positions.

2. The mobile information communicating terminal device according to claim 1, wherein the body has left and right upper edge portions protruded upward and the camera receiver unit is provided between the protruded portions.

3. The mobile information communicating terminal device according to claim 1, wherein the at least one stopper is located on the body of the communicating terminal device and is adapted to contact the camera receiver unit to stabilize the camera receiver unit at predetermined positions.

4. The mobile information communicating terminal device according to claim 1, wherein the camera receiver unit has a concave portion on at least one side surface and the body of the communicating terminal device includes the at least one stopper for pressing the concave portion by elastic force.

5. The mobile information communicating terminal device according to claim 2, wherein the at least one stopper projects from at least one of the left and right upper edge portions of the body.

6. A mobile information communicating terminal device provided having a television telephone function, comprising:

a body of the communicating terminal device; and a camera unit pivotally supported on the body in a vertical direction, wherein calling can be carried out in states in which the camera unit is turned toward a front face of a body housing and toward a back face thereof, wherein a light receiving face of the video camera section and a voice output face of the speaker section are separated into a front-side and a back-side of the camera receiver unit.

7. A mobile information communicating terminal device with a video camera comprising:
   a body of the communication terminal device; and
   a camera receiver unit having a video camera section and a speaker section mounted, which is pivotally supported in a vertical direction with respect to an upper edge face of the body,
   wherein the body has left and right upper edge portions protruded upward and the camera receiver unit is provided between the protruded portions,
   wherein a light receiving face of the video camera section and a voice output face of the speaker section are separated into a front-side and a back-side of the camera receiver unit.

8. The mobile information communicating terminal device of claim 7, further comprising a shaft coupled to the camera receiver unit to facilitate vertical rotation of the camera receiver unit.

9. A mobile information communicating terminal device with a video camera comprising:
   a body of the communication terminal device; and
   a camera receiver unit having a video camera section and a speaker section mounted, which is pivotally supported in a vertical direction with respect to an upper edge face of the body,
   wherein the body has left and right upper edge portions protruded upward and the camera receiver unit is provided between the protruded portions,
   wherein at least one of the protruded portions includes a stopper to facilitate stabilizing the camera receiver unit at predetermined positions.

10. A mobile information communicating terminal device with a video camera comprising:
    a body of the communication terminal device;
    a camera receiver unit having a video camera section and a speaker section mounted, which is pivotally supported in a vertical direction with respect to an upper edge face of the body, wherein the body has left and right upper edge portions protruded upward and the camera receiver unit is provided between the protruded portions; and
    a shaft coupled to the camera receiver unit to facilitate vertical rotation of the camera receiver unit,
    wherein the shaft is hollow and a flexible printed board for electrically connecting the camera receiver unit and a body printed board and a lead wire for electrically connecting the speaker section and the body printed board penetrate through the shaft.

11. A mobile information communicating terminal device with a video camera comprising:
    a body of the communication terminal device;
    a camera receiver unit having, a video camera section and a speaker section mounted, which is pivotally supported in a vertical direction with respect to an upper edge face of the body, wherein the body has left and right upper edge portions protruded upward and the camera receiver unit is provided between the protruded portions; and
    a flexible printed board having a central portion twisted to form a loop to mitigate breaking of the flexible printed board during rotation of the camera receiver unit.

* * * * *